United States Patent [19]

Christner et al.

[11] Patent Number: 5,376,459
[45] Date of Patent: Dec. 27, 1994

[54] METHOD FOR TREATING LEATHER

[75] Inventors: Juergen Christner, Seeheim-Jugenheim; Harald Bauer, Weiterstadt; Maria L. Weber, Roedermark; N'Guéyilbacu/e/: Victor, Karlsdorf, all of Germany

[73] Assignee: Röhm GmbH, Darmstadt, Germany

[21] Appl. No.: 160,468

[22] Filed: Dec. 1, 1993

Related U.S. Application Data

[62] Division of Ser. No. 41,000, Mar. 31, 1993, Pat. No. 5,288,809.

Foreign Application Priority Data

[30]
Apr. 3, 1992 [DE] Germany ............................. 4211060

[51] Int. Cl.$^5$ .......................... B05D 7/12; B32B 9/02; C14C 9/00; C08F 265/06
[52] U.S. Cl. ..................... 428/473; 428/540; 427/389; 427/421; 525/309
[58] Field of Search ................ 428/473, 540; 427/389, 427/421

[56] References Cited

U.S. PATENT DOCUMENTS 4,000,958  1/1977  Hirooka et al.
4,876,313  10/1989  Lorah.

FOREIGN PATENT DOCUMENTS 2202229  9/1988  United Kingdom.

Primary Examiner—Vasu S. Jagannathan

[57] ABSTRACT

The invention concerns graft copolymers, useful for the treatment of leather, comprising monomers of the formula

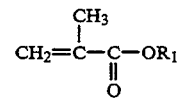

grafted onto a base polymer comprising monomers of the formula

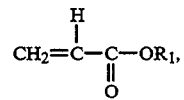

wherein $R_1$ and $R_2$ stand for a hydrocarbon group having 2 to 24 carbon atoms, with the proviso that the groups $R_1$ and $R_2$ have van der Waals volumes which differ from one another by less than 30 percent.

8 Claims, No Drawings

METHOD FOR TREATING LEATHER

This application is a division of application Ser. No. 08/041,000 filed Mar. 31, 1993 now U.S. Pat. No. 5,288,809.

The present invention relates to polymer products for the treatment of leather, consisting of graft copolymers comprising acrylate and methacrylate polymers, and to methods for treating leather with these products.

Polymer dispersions comprising acrylates play a significant role in the dressing of leather. Polymer products comprising polyacrylates are used both for impregnation and grounding and also, more recently, have increasingly been used for top coating [cf. J. A. Handscomb, J. Soc. Leather Trades Chem. 43, 237 (1959); ch. Cluthe et al., J. Am. Leather Chem. Assoc., 73(1), 22–29 (1978); U.S. Pat. No. 4,491,645].

Polyurethane dispersions, acrylate-butadiene dispersions, polyvinyl chloride/polyvinyl acetate dispersions, nitrocellulose emulsions, inter alia, are also of significance in the dressing of leather. Although the number of acrylate dispersions used in leather dressing has reached a high level, nevertheless they have only limited usefulness at various points. The reasons for this are probably first to be sought in certain inherent material properties which in these cases have a negative effect, e.g. a high thermal plasticity which makes itself evident in a poor susceptibility of the leather to stamping. For many uses, e.g. in grounding, an often too strong tackiness of the acrylate film has proved disadvantageous. The mechanical properties of films of acrylate dispersions, such as extension to break and tensile strength, are too small to meet high demands, a condition which exhibits itself as an insufficient resistance to flexing (e.g. in the Bally-Flexometer test). Also problematic are their resistance to water and solvents, which is more strongly evident, e.g., for polyurethane dispersions.

Thus, there was a need for improved polymer products comprising polyacrylates and polymethacrylates [hereinafter "poly(meth)acrylates"] for the treatment, particularly the dressing, of leather, which would avoid the disadvantages observed in the leather treating field while retaining the otherwise advantageous spectrum of properties of (meth)acrylate polymers.

It has now been found that, surprisingly, the requirement of the technology are particularly well met by graft polymers comprising (meth)acrylate, in which a graft monomer of the formula (I)

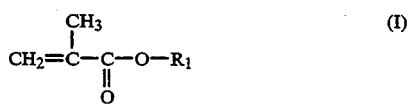

where $R_1$ stands for a hydrocarbon group, particularly an alkyl group, having 2–24 carbon atoms, preferably 2–8 carbon atoms, especially for $C_2$–$C_4$-alkyl, and particularly for ethyl, butyl, and isobutyl, is grafted onto a base or "backbone" polymer including 55–100 percent by weight, particularly 85–100 percent by weight of monomers of the formula (II)

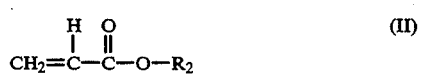

where $R_2$ stands for a hydrocarbon group having 2–24 carbon atoms, preferably 2–8 carbon atoms, particularly an alkyl group, and particularly for the groups ethyl, butyl, and 2-ethylhexyl, with the proviso that the groups $R_1$ and $R_2$ have van der Waals volumes which are different by less than 30 percent of the larger volume. [For a discussion of van der Waals volees and atomic radii, and particularly various atomic group contributions to the van der Waals volume of hydrocarbons, see A. Bondi, "van der Waals Volumes and Radii", J. Phys. Chem. 68, 441–451 (1964), further discussed by M. Charton, J. Am. Chem. Soc. 91(3), 615–618 (1968). Some volumes are tabulated in standard reference works such as the *Handbook of Chemistry and Physics*, 57th Edition, R. C. Weast, editor, page D-178, CRC Press 1977.]

It is advantageous if the condition prevails that the heats of mixing of the hydrogenated monomer components of the formula (I-hydr)

and of the hydrated monomer components of the formula (II-hydr)

wherein $R_1$ and $R_2$ have the aforementioned meanings, are in each case less than 100 cal/mol of mixture.

The van der Waals volumes according to Bondi, loc. cit., are preferably less than 20 percent.

Determination of the heats of mixing of the hydrated monomer compositions is in general not absolutely necessary because in a series of instances they can be found directly in comprehensive tabulated values. Reference is made to the monograph *Mischungswärmen von Flüssigkeiten* ("Heats of Mixing of Liquids"), by W. P. Belousow and A. G. Moratschewski, Verlag Chemie, Leningrad (1970).

By definition, $R_1$ and $R_2$ in the formulas (I), (II), (I-hydr), and (II-hydr) stand for a hydrocarbon group having at least 2–24 carbon atoms, preferably for an acyclic, optionally branched, alkyl group, particularly having at least 2 and up to 8 carbon atoms, or for a cyclic hydrocarbon group having 5 to 12 ring members, particularly an alicyclic group.

A series of suitable I/II combinations can be taken from DE-OS 37 08 427 (=U.S. Pat. No. 4,900,791, incorporated herein be reference). Polymer mixtures of polyacrylates and polymethacrylates are described there. It is also advantageous to graft monomers from the series of polymethacrylates named in DE-OS 37 08 427 onto the polyacrylates which are compatible with these polymethacrylates.

It should further be explained that the monomers which are involved in the structure of the base or backbone polymer usually stand in a weight ratio of 10 to 90 to 90 to 10, preferably 90 to 50 to 50 to 10, and in the particularly preferred ratio 60 to 40 to 80 to 20 to the graft monomers.

In addition to the monomers of formula (I), further suitably selected monomers can be co-grafted, for example other methacrylic acid esters, particularly preferably methyl methacrylate, which can be contained in amounts from 0–80 percent by weight, preferably in amounts of 10–60 percent by weight, and very particularly preferably in amounts from 15 to 40 percent by weight of the graft monomers. In the same way, it is possible to co-graft acrylic acid esters, e.g. methyl acrylate or ethyl acrylate in amounts from 0.1 to 10 percent by weight, preferably 0.2–5 percent by weight.

The amount of functional comonomers such as methylol methacrylamide, methacrylic acid, or methacrylamide should be less than 5 percent by weight. Preferably, the mixture of graft monomers contains no glycidyl methacrylate and no maleic acid anhydride. Likewise, the amount of styrene, acrylonitrile, and monomers containing halogen in the graft monomer mixture should be less than 10 percent by weight, preferably less than 1 percent by weight, and particularly preferably at 0 percent by weight. In general, the molecular weight of the base polymer (determined by viscosimetry or light scattering) is in the range from 200,000 to 1,000,000,000, preferably up to 10,000,000. The base polymers are preferably also not crosslinked after grafting. Nevertheless, it can happen that the original high-polymeric non-crosslinked base polymer is slightly crosslinked by the grafting thereon of the graft monomer mixture (the amount of crosslinking points is less than 0.01 percent by weight, preferably less than 0.001 percent by weight). High-polymeric non-crosslinked base polymers are very particularly preferred. In contrast, the grafted branches, i.e. the graft polymers grafted onto the base polymer are essentially shorter-chained. In general, the molecular content of the graft branches is from 1,000–1,000,000 Daltons, preferably 2,000–500,000, and particularly preferably 5,000–200,000. In general 10–100 percent by weight (particularly 20–95 percent by weight) of the total graft monomers are grafted onto the grafting support.

The base polymer preferably consists of 55–100 percent by weight, more preferably from 85–100 percent by weight, and most preferably of 91–100 percent by weight of moncuners having formula II.

As further monomers, the base polymers can contain other monomers copolymerizable with acrylic acid esters in amounts equal to or less than 45 percent by weight, preferably in amount less than 15, and most preferably in amounts less than 9 percent by weight and to 0.1 percent by weight: Here, methacrylic acid esters are particularly to be named. Accordingly, it is preferred to proceed from mixtures of two different monomers of the formula II. The base polymer can contain styrene in amounts up to 25 percent by weight, preferably less than 15 percent by weight. Optionally substituted phenyl(alkyl)acrylates deserve special interest, for example benzyl acrylate or phenylpropyl acrylate, which can be present in amounts from 0–30 percent by weight. Also, methyl acrylate can be copolymerized in amounts up to 45 percent by weight in the synthesis of the base polymer. Amounts of hydrophilic monomers such as hydroxyalkyl acrylate or methacrylic acid can be copolymerized in amounts of 0–5 percent by weight, preferably in amounts of 0–3, and most preferably in amounts of 0.1–0.5 percent by weight Butadiene or isoprene should generally not be copolymerized and their content in the base polymer should be less than 5 percent by weight, With those base polymers which contain neither butadiene nor isoprene being particularly preferred. Likewise, as a rule polyfunctional methacrylic acid esters such as butanediol dimethacrylate or polyfunctional acrylic acid esters such as hexanediol diacrylate should not be used in the synthesis of the base or backbone polymers. Their content in the base polymers should be limited to less than 0.01 percent by weight. Monomers which actively graft, such as allyl (meth)acrylates or vinyl (meth)acrylates, e.g. allyl acrylate, in contrast can be present in amounts up to 1 percent by weight (preferably in amounts up to 0.3, more preferably up to 0.2, and most preferably up to 0.09 percent by weight). Chain transfer agents such as mercaptans, e.g. 2-ethylhexyl thioglycolate, must be used (in amounts less than 0.5 percent by weight) particularly with large amounts of graft-active monomers in order to avoid crosslinking of the acrylate polymers. Graft polymers wherein the hydrocarbon groups $R_1$ and $R_2$ signify $C_2$–$C_4$-alkyl have proved especially suitable in the leather field, particularly for products for dressing leather.

Base polymers in which $R_2$ of formula (II) stands for ethyl (polyethyl acrylate) and graft monomers of formula (I) in which $R_1$ stands for ethyl (ethyl methacrylate) can be held out as a paradigm for the present invention. In this case, polyethyl acrylate-polyethyl methacrylate graft polymers are obtained, for example by a simple polymerization in which the monomers are fed in, which polymers form glass-clear, tough synthetic resin films at room temperature. Likewise, good results are obtained if $R_1$=n-butyl and $R_2$=isobutyl.

In principle, the relevant polymerization methods of the prior art [cf. H. Rauch-Puntigam, Th. Völker, *Acryl- und Methacrylverbindungen* ("Acrylic and Methacrylic Compounds"), Springer Verlag 1967; H. F. Mark et al, *Encyclopedia of Polymer Science and Engineering*, 2nd edition, Vol. 1, 265–276, John Wiley & Sons 1985] are suitable for the preparation of the polymers, wherein for the preparation of the base or backbone polymer conditions are advantageously used with do not promote crosslinking. As a rule, free radical polymerization employing the usual free radical initiators is used.

In every case, the base polymer is prepared first and is then grafted with the graft monomers in a solvent which shows little tendency for transfer, e.g. butyl acetate, at the highest possible temperature, e.g. 120° C. The grafting of the high molecular weight base polymer directly, in a melt without a solvent, using an extruder or pressure reactor at temperatures from 150° C. to 200° C. is of special interest. In this case, the base polymer is preferably first prepared in a solvent or by bulk polymerization to only a small degree of conversion, degassed, and then grafted with the graft monomers. To achieve easily handled base polymers, their molecular weight is to be limited to values less than 1,000,000, optionally with the addition of chain transfer agents.

For this, above all, preparation by an emulsion polymerization method in an aqueous medium is technically significant. As initiators, those conventionally used for this purpose, e.g. potassium-or ammonium peroxydisulfate are used, generally in amounts of 0,001 to 0.5 percent by weight, based on the monomers, but also, optionally, a redox system (cf. Rauch-Puntigam, loc.cit., pages 221–229). While the use of readily graftable monomers in the base polymer has advantages, it has proved disadvantageous to force grafting by the addition of large amounts of initiator. This procedure leads to thermally labile polymers.

As emulsifiers, again those known in the art are useful, particularly anionogens such as the alkali metal salts of paraffin sulfonates, and are normally used in amounts from 0.5–5 percent by weight (based on the amount of water).

The preparation of the graft polymers in a two-stage emulsion polymerization process, wherein the first stage, the preparation of the base polymer is advantageously carried out as a batch polymerization, is of particular interest. In this way, it is possible to obtain, for example, non-crosslinked polyacrylates having a desired high molecular weight (for example having a viscosity number, J=200-1000 ml/g, determined according to ISO 1628-6 or DIN 51562, parts 2 and 3 and DIN 7745, part 2) in a particularly easy fashion.

Suitably, the grafting of the graft monomers follows directly thereafter as a polymerization wherein the monomer mixture is run into the reaction mixture over a period of time. This step is advantageously carried out at temperatures of 70° C.-100° C. For this, in particular, one can proceed as follows:

At first an aqueous emulsion of the monomers is prepared, with addition of emulsifiers and of initiators, wherein—as a model—the ratio of monomer to water in parts by weight can be about 1:2.

One can advantageously proceed so that at first only the peroxidic partner of the redox initiator system is added. Then the batch is warmed, suitably under an inert gas blanket such as of nitrogen/argon to a suitable temperature, for example 35°±10° C. with addition of the reducing partner of the redox system. Usually the temperature rises sharply within a short time (about 10 minutes is mentioned as a model), to about 85°±5° C. Thereafter, the graft monomers are added, preferably dropwise, as a rule within about 15-90 minutes. Subsequently the polymerization is carried to termination with warming, for example by holding the temperature at about 80° C.

The graft copolymer is usually obtained in the form of a stable dispersion having a polymer content usually in the range from 20 to 70 percent by weight based on the total dispersion, and can be dried to form a tough elastic film either directly or after the addition of ammonia, for example. The residual monomer content is usually in the range of parts per million.

By variation of the monomers of the base polymer and of the graft monomers, the hardness or consistently of the films can be influenced and guided in diverse ways. [Concerning the influence of the monomers on the "hardness" of the polymers, see ViewegEsser, *Kunststoffhandbuch* ("Synthetic Resin Handbook"), Vol. IX, Carl Hanser Verlag, 1975; H. F. Mark et al, *Encyclopedia of Science & Engineering*, 2nd Ed., Vol. 7, pg. 533-544, J. Wiley 1987; Kirk-Othmer, *Encyclopedia of Chemical Technology*, 3rd Ed., Vol. 1, pg. 387-389, J. Wiley, 1978).]

For the grounding step in leathers, "soft" graft polymers having a film hardness Shore A20 to A50 are preferably used. (For determination of the Shore Hardness, see DIN 53 505 or ASTM D 676).

As a first approximation, film hardness can be adjusted, on the one hand, by selection of the graft monomers and, on the other hand, by the admixture of "soft" and "hard" graft polymers. As examples for "soft" graft polymers, can be mentioned those containing butyl methacrylate and/or ethylhexyl methacrylate as graft components, which optionally may be co-grafted with "harder" monomers such as ethyl methacrylate, methyl methacrylate, inter alia. As "harder" graft polymers those with ethyl methacrylate, methyl methacrylate, benzyl methacrylate, as graft comonomers, optionally in admixture, can be mentioned.

The methods and modalities of the uses of the graft copolymers according to the invention are close to those of the state of the art [cE. H. Herfeld, Ed., *Bibliothek des Leders* ("The Leather Library"), Vol. 6; R. Schubert, *Lederzurichtung—oberflächenbehandlung des Ledars* ("Leather Dressing—Surface Treatment of Leather"), Umschau 1982, pg. 148-219], just as are the useful leather toppings and brightening auxiliaries and finishing auxiliaries. Application by spraying, by "airless" spraying, roller coating inter alia are particularly recommended.

The coats of groundings and seasons can be mixed, for example to improve physical properties such as buckling strength, resistance to water and solvents, extension, etc. or stampability, with certain additional polyurethane dispersions, as well as with crosslinking systems comprising epoxides, polycarbodiimides, polyisocyanates, or polyaziridines. These crosslinking systems in general stand in a weight ratio of 100 to 10 to 100 to 0.1 with respect to the copolymer product. Practise has shown that the amount of non-grafted polymer dispersion may not be too high so that the formation of the hard-soft segmented structure is not overly disturbed. Thus, as a rule the amount of non-grafted polymer dispersion should not exceed 90 percent of the total polymer dispersion.

To achieve a minimum film thickness as well as a sufficient covering effect, the use of thickening agents known per se is indicated. As thickeners, for example, are those from the group formed by polyglycol polyurethanes, polyvinyl pyrrolidone, or acrylate (co)polymers. In general, the thickeners stand in a weight ratio of 100 to 10 to 100 to 0.01 with respect to the graft polymers. By adjustment and adaptation of the viscosity, the penetrating power or the degree of covering can be well controlled. As already discussed, the film hardness and film consistency can be extensively steered in the desired direction by suitable variation of the mongers in the graft- and base polymers, as well as by selection of the ratio of base polymer to graft polymer. As a further advantage in connection with usage, particularly in the dressing of leather, it is noted that all conventional auxiliaries, especially those commercially available, for regulating hand, color, flow, and viscosity can be used. These are generally solutions (e.g. flow agent products comprising glycol ether, ethers such as butyl glycol, methoxypropanol, tributoxyethyl phosphate, etc.) or emulsions/dispersions with casein, waxes, silicones in the amounts or concentrations usually used [cf. F. Stather, *Gerbereichemie und Gerbereitechnolqie* ("Tanning Chemistry and Tanning Technology"), Akademie Verlag, Berlin, 1967, pages 507-632; R. Schubert, loc. cit.].

In particular, the leather colorants known in the art can be used very effectively (cf. F. Stather, loc. cit., pg. 615-632), for example in the form of pigment pastes, also in case of necessity matting agents can be used, for example those comprising silicates.

Particularly outstanding properties of the graft polymers of the invention which should be mentioned are their relatively small thermoplasticity and the good tensile and extension properties. In the coating of leather this condition shows itself in an outstanding stepability, slight adhesion or good resistance to blocking, as well as in a higher flexibility.

A fundamental prerequisite for the attainment of these properties is a tempering of the coated material at certain minimum temperatures. The minimum temperature can be brought into the range of 6° C.–120° C., advantageous for leather dressing, by way of the composition of the polymers. Heating may be done with conventional heat sources or by the use of infrared or microwave radiation.

The tempering time also plays a role in producing optimum properties. Above all, a favorable influence on the aforementioned properties is brought about during the treatment times conventional for dressing, which are divided into the steps of drying, pressing, and stamping. In the case of drying, on the average:, for example, 2 to 5 minutes at temperatures in the range from 60° C.–90° C. are to be added on. The static and dynamic procedures of ironing and stamping follow at temperatures between 70° C. and 170° C., as a rule applied during a few seconds, as a model 2–6 seconds may be mentioned, under pressures of 50–300 bar.

In general it can be said that the physical properties of the coating can additionally be raised by extension of the tempering time. In practise, one advantageously proceeds so that the aqueous polymer dispersions can be used in the form in which they are prepared.

For making dressings, the graft polymer, preferably in dispersion form, is used as the starting point. To it, water and then the additives, such as matting agents, casein-fat emulsion, then the aqueous paraffin emulsion, also the pigment paste and the coalescing agent, the Silicon emulsion and, at last, optional thickening agent are added with stirring.

According to this procedure, two formulations, a) and b) are prepared (for a summary, see Table 1.)

EXAMPLES

A-1: Use as Grounding for Full-Grain Nappa Leather

Formulations a) or b) are sprayed on once or twice to saturation (20–40 g/m$^2$) using a commercially available compressed air spray gun (about 4 bar pressure, nozzle breadth 1.2 or 1.4 mm). This is followed by drying either at 60° C.–80° C. in a drying tunnel for 1–5 minutes with circulation of heated air or at room temperature. (Alternatively, heating could be by microwave or infrared radiation.) This is followed by ironing at 80° C.–90° C. with a pressure of 50–100 bar. Then the piece is sprayed twice more with the relevant formulation at medium coverage (about 10–20 g/m$^2$) and dried as described above.

The total amount of material applied amounts to 60–100 g/m$^2$. The results are reported in Table 2.

A-2: Use as Grounding for Buffed Furniture Leather

Formulations a) or b) are sprayed on twice, if desired "airlessly", with good coverage (75–125 g/m$^2$). Drying follows as under A-1. Then an intermediate lacquer (nitrocellulose emulsion) is sprayed on, followed by drying [see (A-1)], and finally the piece is stamped at a temperature of 90° C., at a pressure of 250 bar, for a duration of 3 seconds. A stamping plate having an medium pore grain is used. The piece was again sprayed at medium strength (25–50 g/m$^2$), dried, and then milled for 8 hours.

The total amount applied was 200–300 g/m$^2$. The results are reported in Table 2.

A-3: Use as Grounding for Tanned Splits

The formulations a) or b) are applied once by means of roller coating with reciprocal strokes (100–175 g/m$^2$.) The piece is then ironed at 90° C. and 150 bar for 3 seconds, followed by a double roller coating first with 75–100 g/m$^2$ and then with 25–75 g/m$^2$. Then a nitrocellulose emulsion is applied as an intermediate layer. Then the piece is stamped at 90° C. and 250 bar for 3–5 seconds.

The total amount applied amounts to 200–350 g/m$^2$. The results are reported in Table 2.

A-4: Use as a Top Coat

In a first step, grounding is accomplished using a conventional grounding recipe.

Then, the formulations a) and b) are sprayed on twice. The total amount applied is 30–60 g/m$^2$. The results are evident in Table 2.

TABLE 1

Examples of Recipes for Grounding- and Top-Coatings on Different Leather Types (in Parts by Weight)

| Test Leather Type | A-1 Grounding for Full Grained Nappa a) | A-1 Grounding for Full Grained Nappa b) | A-2 Grounding for Buffed Furniture Leather a) | A-2 Grounding for Buffed Furniture Leather b) | A-3 Grounding for Tanned Splits a) | A-3 Grounding for Tanned Splits b) | A-4 Application as a Top Coat a) | A-4 Application as a Top Coat b) |
|---|---|---|---|---|---|---|---|---|
| Black pigment Paste (35%) | 100 | 150 | 120 | 150 | 120 | 150 | — | — |
| Aqueous casein-fat Emulsion (20%) | — | — | 40 | 60 | 80 | — | — | — |
| Aqueous Paraffin Emulsion (22%) | 40 | 60 | 40 | 20 | 20 | — | 20–50 | 20–50 |
| Aqueous Matting Paste Comprising Silicic Acid (30%) | 0–30 | 0–50 | 0–50 | 0–50 | 0–50 | 0–50 | 0–20 | 0–20 |
| Water | to 1000 (with preceding ingredients) | | | | | | | |
| Aqueous Polyurethane Dispersion (35%) | — | — | — | 40 | — | 50 | — | 20 |
| Acrylate Dispersion of any of Ex. B(1) - B(3) (40%) (Shore-Hardness A20–A50) | 200 | 300 | 450 | 410 | 600 | 550 | 300 | 280 |
| With thickener (Acrylic Acid Copolymer) of Viscosity 16–22 (Measured in Ford Beaker with 4 mm Nozzle) Depending on Absorptive Capacity of Leather | — | — | x | x | x | x | — | — |
| Coalescing Agent Comprising Glycol Ether (100%) | — | — | — | — | — | — | 10–15 | 10–15 |
| Aqueous Silicone Emulsion (30%) | 0–20 | 0–20 | 0–20 | 0–20 | 0–20 | — | 0–5 | 0–5 |
| Total Amount Applied in gm$^2$ | 60–110 | 80–120 | 200–300 | 200–300 | 200–350 | 200–350 | 30–60 | 30–60 |

TABLE 1-continued

Examples of Recipes for Groundings- and Top-Coatings on Different Leather Types
(in Parts by Weight)

| Test Leather Type | A-1 Grounding for Full Grained Nappa | | A-2 Grounding for Buffed Furniture Leather | | A-3 Grounding for Tanned Splits | | A-4 Application as a Top Coat | |
|---|---|---|---|---|---|---|---|---|
| | a) | b) | a) | b) | a) | b) | a) | b) |
| in 2-4 Working Operations | | | | | | | | |

TABLE 2

Physical Properties of the Dressed Leather of Table 1

| | | Flexometer (dry)[2] (Number of Folds) | | Flexometer (wet)[2] (Number of Folds) | | Rubbing Resistance[1] (VESLIC wet) (Number of Rubbings) | |
|---|---|---|---|---|---|---|---|
| 1 = Drying at room temperature 2 = Drying 10 minutes at 90° C. | | 1 | 2 | 1 | 2 | 1 | 2 |
| A-1 Full Grain Nappa Leather (0.8-0.9 mm thick, without Top Coat | a) | 30,000 to 50,000 | 70,000 to 100,000 | 20,000 to 30,000 | >50,000 | 100-150 | 200-300 |
| | b) | 30,000 to 50,000 | 70,000 to 100,000 | 20,000 to 30,000 | >50,000 | 100-150 | 200-300 |
| A-2 Buffed Furniture Leather (1-1.1 mm thick, without Top Coat | a) | 20,000 to 40,000 | 70,000 to 100,000 | 20,000 | 50,000 | 200 | 400 |
| | b) | 20,000 to 40,000 | 70,000 to 100,000 | 20,000 | 50,000 | 200 | 400 |
| A-3 Tanned Splits (1.8-2.0 mm thick, without Top Coat | a) | 20,000 | 60,000 | 10,000 | 40,000 | — | — |
| | b) | 30,000 | 50,000 | 20,000 | 40,000 | — | — |
| A-4 Values with Top Coat | a) | — | — | — | — | 150 | 300 |
| | b) | — | — | — | — | 150 | 400 |

[1]Testing on VESLIC Rubbing Resistance Apparatus with wet felt according to DIN 53 339
[2]Test of Continuous Fold Resistance with dry or wet leather according to DIN 53 351

The graft copolymers according to the invention can be prepared, for example, according to the following Examples.

B-(1): Graft copolymer comprising a base polymer of ethyl acrylate/methacrylic acid grafted with ethyl methacrylate in a weight ratio (69.65:0.35):30

An emulsion of 300 g of ethyl acrylate, 1.51 g of methacrylic acid, 3.1 g of the sodium salt of $C_{15}$-paraffin sulfonate as an emulsifier, 0.62 g of ammonium peroxydisulfate, 0.8 mg of $FeSO_4$, and 566 g of water is warmed to 30° C. and combined under an inert gas (nitrogen or argon) with 0.31 g of $Na_2S_2O_5$. The temperature rises within 8–10 minutes to 103° C. Immediately thereafter, 129 g of ethyl methacrylate are added dropwise over 15 minutes. For final polymerization, the batch is stirred for 60 minutes at 90° C., then cooled.

A stable dispersion is obtained which can be dried directly or after addition of $NH_3$ to form a tough elastic film. After drying in a drying cabinet at 90° C., a transparent film is obtained. For further characterization, see Table 3.

B-(2): Graft copolymer comprises a base polymer of ethyl acrylate/methacrylic acid grafted with ethyl methacrylate in a weight ratio (72.75:2.25):25

As in Example B-(1), an emulsion of 304 g of ethyl acrylate, 9.39 g of methacrylic acid, 3.1 g of the sodium salt of a $C_{15}$-sparaffin sulfonate, with 0.63 g of ammonium peroxydisulfate and 0.8 mg $FeSO_4$ as well as 0.31 g $Na_2S_2O_5$ is polymerized in 587 g of water and 104 g of ethyl methylacrylate is grafted thereon.

B-(3): Graft copolymer comprising a base polymer of ethyl acrylate/butyl acrylate/methacrylic acid grafted with ethyl methacrylate in a weight ratio (65.25:7.5:2.25):25

As in Example B-(1), an emulsion of 273 g of ethyl acrylate, 31.3 g of butyl acrylate, 9.39 g of methacrylic acid, 3.1 g of the sodium salt of a $C_{15}$-paraffin sulfonate is polymerized in 566 g of water with 0.62 g of ammonium peroxydisulfate and 0.78 mg $FeSO_4$ as well as 0.31 g of $Na_2S_2O_5$. 104 of ethyl methacrylate are polymerized thereon by grafting.

Determination of the tensile strength of the films is made according to DIN 53 455 or ISO/R 527, of extension to break according to DIN 53 455, of Shore-D-Hardness according to DIN 53 505.

B-(4): Crosslinked graft copolymer comprising ethyl acrylate/allyl methacrylate grafted with ethyl methacrylate in a weight ratio (69.85:0.15):30

As in Example B(1) an emulsion of 300 g of ethyl acrylate, 0.63 g of allyl methacrylate, 3.1 g of the sodium salt of a $C_{15}$ paraffin sulfonate and 0.63 g of ammonium peroxydisulfate, 0.8 mg of $FeSO_4$, and 0.31 g of $Na_2S_2O_5$ in 600 g of water is polymerized and 129 g of ethyl methacrylate are grafted onto the base polymer formed.

TABLE 3

| Example No. | Tensile Strength [MPa] | Extension to Break [%] | Shore-Hardness |
|---|---|---|---|
| B-(1) | 8.31 | 970 | 81 |
| B-(2) | 6.8 | 900 | 60 |
| B-(3) | 5.6 | 750 | 55 |
| B-(4) | .10 | 690 | — |

B(5): Graft copolymer of 2-ethylhexyl acrylate/methacrylic acid grafted with 2-ethylhexyl1 methacrylate in a weight ratio (68:2):30.

As in Example B(1), an emulsion of 238 g of 2-ethylhexyl acrylate, 7 g of methacrylic acid, 2.63 g of the sodium salt of a $C_{15}$-paraffin sulfonate with 0.53 g of ammonium peroxydisulfate and 0.8 mg of $FeSO_4$, as well as 0.26 g of $Na_2S_2O_5$ in 592 g of water is polymerized and 105 g of 2-ethylhexyl methacrylate are grafted onto base polymer so formed.

What is claimed is:

1. A method for the treatment of leather which comprises uniformly applying to the surface of the leather a graft copolymer comprising the product obtained by grafting at least one graft monomer of the formula

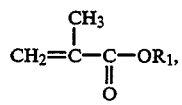

wherein $R_1$ stands for a hydrocarbon group having 2-24 carbon atoms, onto a base polymer comprising 55-100 percent by weight of at least one monomer of the formula

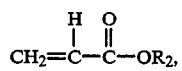

wherein $R_2$ stands for a hydrocarbon group having 2 to 24 carbon atoms, with the proviso that the groups $R_1$ and $R_2$ have van der Waals volumes which differ from one another by less than 30 percent of the value of the larger volume.

2. A method as in claim 1 wherein the graft copolymer is present in an aqueous dispersion.

3. A method as in claim 2 wherein the dispersion also contains a thickener.

4. A method as in claim 2 where in the dispersion also contains a crosslinking agent.

5. A method as in claim 2 wherein the dispersion also contains an auxiliary for modification of the leather properties.

6. A method as in claim 1 wherein the treated leather is tempered at a temperature between 60° C. and 120° C.

7. A method as in claim 6 wherein tempering is effected using infrared or microwave radiation.

8. Leather having a coating layer thereon of a film-forming graft copolymer comprising the product obtained by grafting at least one graft monomer of the formula

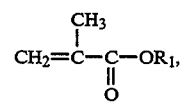

wherein $R_1$ stands for a hydrocarbon group having 2-24 carbon atoms, onto a base polymer comprising 55-100 percent by weight of at least one monomer of the formula

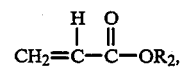

wherein $R_2$ stands for a hydrocarbon group having 2 to 24 carbon atoms, with the proviso that the groups $R_1$ and $R_2$ have van der Waals volumes which differ from one another by less than 30 percent of the value of the larger volume.

* * * * *